United States Patent
Liu (10) Patent No.: US 9,134,480 B2
(45) Date of Patent: Sep. 15, 2015

(54) EFFICIENT HEATING GROOVE FOR OPTICAL-FIBER FUSION SPLICER AND OPTICAL-FIBER FUSION SPLICER

(71) Applicant: DH INFOTECH (WEIHAI) INC., WeiHai, Shangdong Province (CN)

(72) Inventor: Peng Liu, WeiHai (CN)

(73) Assignee: DH INFOTECH (WEIHAI) INC., Weihai, Shandong Province (CN)

( * ) Notice: Subject to any disclaimer, the term of this patent is extended or adjusted under 35 U.S.C. 154(b) by 0 days.

(21) Appl. No.: 14/338,899

(22) Filed: Jul. 23, 2014

(65) Prior Publication Data
US 2015/0030294 A1 Jan. 29, 2015

(30) Foreign Application Priority Data

Jul. 24, 2013 (CN) .......................... 2013 1 0312912
Jul. 24, 2013 (CN) .......................... 2013 1 0313248

(51) Int. Cl.
| | |
|---|---|
| *G02B 6/255* | (2006.01) |
| *F27D 11/00* | (2006.01) |
| *H05B 3/06* | (2006.01) |
| *H05B 3/58* | (2006.01) |
| *H05B 3/16* | (2006.01) |
| *H05B 3/50* | (2006.01) |
| *H05B 3/10* | (2006.01) |

(Continued)

(52) U.S. Cl.
CPC ................ *G02B 6/2558* (2013.01); *H05B 3/10* (2013.01); *G02B 6/2553* (2013.01); *G02B 6/4476* (2013.01); *H02G 15/1806* (2013.01); *H05B 3/06* (2013.01)

(58) Field of Classification Search
CPC .... G02B 6/2558; G02B 6/2553; G02B 6/255; G02B 6/4476; H02G 15/1806; H05B 3/06; H05B 3/10; H05B 3/18
USPC .............. 385/96, 99; 219/385, 521, 534, 535, 219/539, 543, 544
See application file for complete search history.

(56) References Cited

U.S. PATENT DOCUMENTS 596,696 A * 1/1898 Custer ........................... 219/395
4,509,820 A * 4/1985 Murata et al. ................... 385/99

(Continued)

FOREIGN PATENT DOCUMENTS

| CN | 101743494 A | 6/2010 |
| CN | 102548062 A | 7/2012 |

(Continued)

*Primary Examiner* — Robert Tavlykaev
(74) *Attorney, Agent, or Firm* — Muncy, Geissler, Olds & Lowe, P.C.

(57) ABSTRACT

An efficient heating groove for an optical fiber fusion splicer and an optical fiber fusion splicer. The heat substrate of the heating groove is a metal sheet with heat conducting property. The manufacture method of the heating groove comprises printing, in sequence, insulating medium, heating resistor, transition point conductor, and protection glass glaze on the outer surface of the heating substrate with heat conducting property. Two heating resistors, each with a resistance of 4.7±0.5Ω and power density of 10-20 W/cm$^2$, are separately printed on the outer face of the two heating surfaces in the heating groove. The heating resistor is made of resistive material with a temperature coefficient of 1500±150 ppm/°C. The resistance of the heating resistor is distributed in a way that, the resistance at two ends is larger than that at a center, and the resistance is reduced gradually or by step, from two ends to the center.

10 Claims, 5 Drawing Sheets (51) Int. Cl.
*H02G 15/18* (2006.01)
*G02B 6/44* (2006.01)

(56) References Cited

U.S. PATENT DOCUMENTS

| | | | | |
|---|---|---|---|---|
| 4,526,732 | A | * | 7/1985 | Kakii et al. .................... 264/2.7 |
| 4,680,449 | A | * | 7/1987 | Yamada et al. ............... 219/385 |
| 6,367,990 | B1 | * | 4/2002 | Dumitriu ........................ 385/99 |
| 7,699,540 | B2 | * | 4/2010 | Miyamori et al. ............. 385/96 |
| 8,596,887 | B2 | | 12/2013 | Song et al. |
| 8,866,051 | B2 | * | 10/2014 | Zamzow ....................... 219/538 |
| 2005/0123253 | A1 | * | 6/2005 | Sato ................................ 385/99 |

FOREIGN PATENT DOCUMENTS

| | | | |
|---|---|---|---|
| JP | 2005-257855 | A | 9/2005 |
| JP | 2006-201264 | A | 8/2006 |
| JP | 4532251 | B2 | 8/2010 |
| JP | 2010-217271 | A | 9/2010 |

\* cited by examiner

EFFICIENT HEATING GROOVE FOR OPTICAL-FIBER FUSION SPLICER AND OPTICAL-FIBER FUSION SPLICER

FIELD OF THE INVENTION

The present invention relates to an optical fiber fusion splicer, especially to an efficient heating groove for optical fiber fusion splicer and optical fiber fusion splicer.

BRIEF DISCUSSION OF THE RELATED ART

Generally, the fusion splice of optical fiber connectors includes two main steps. Step 1 is the process of fusion, which comprises pushing, alignment, electric discharge, and loss evaluating. Step 2 is the process of heat shrinking, i.e., after the optical fiber being melted and spliced, a shrinkable protection sleeve covers the splicing point, and is placed in a heating groove of a heat shrinking device to perform shrinking reinforcement. According to different manufacturers, the time required to perform step 1 is about 9 to 15 seconds, and has no potential to be reduced. As to step 2, the process of splicing point reinforcement of domestic or overseas optical fiber fusion splicer in the prior art comprises a heating process and a cooling process after the heating process. At present, the cooling process takes a short time, i.e., a couple of seconds. However, the heating process takes a long time, i.e., generally about 35 seconds. The long time necessary for the heating process leads to a long time for heat shrinking and low efficiency.

The main reasons which contribute to the long time needed for the heating process include:

1. The heating element of heating groove in existing splicers cannot be heated up rapidly. The heating element in existing splicers is a ceramic heating sheet wrapped by aluminum material, which has a heating performance of heating up to 200° C. in 20s.

2. The heating groove in existing splicers has poor heat conduction efficiency. The existing heating groove has a U-shaped structure with a flat base. In the heating process of the heating groove with the aforesaid shape, the contact surface between the heating groove and the shrinkable protection sleeve is merely one edge. Therefore, the heat conduction area is small and the heat conduction efficiency is poor.

Furthermore, once the ceramic heating sheet is manufactured and takes shape, it is impossible to change its shape to enhance the heat conduction efficiency. The shape modeling of the ceramic heating sheet must be completed at soft soil phase before being sintered, and then the ceramic heating sheet is sintered in high temperature. This process will lead to a high cost and a risk of a higher defect rate. Moreover, if the temperature of the ceramic heating sheet, which is commonly used at present, dramatically varies in short time, the outer layer ceramics will crack. A significant risk is therefore introduced to mass production.

In order to avoid these drawbacks, including that the ceramic heating sheet cannot be heated up rapidly, a PI (Polyimide) heating film is wrapped by aluminum material and adhered to the aluminum metal with glue, and then applied in a few heating grooves of splicers, so as to improve the heating performance. However, the glue, which is used to adhere the PI heating film to the aluminum material, is expensive. Furthermore, even if the PI heating film could be mould flexibly to enhance the heat conduction efficiency, the product cannot be heated in a large area because of its higher power density requirement. It can merely heat a small area, and then the heat extended to two sides through thermal transmission. Finally, since the heating sheet with aluminum material is adopted, aluminum ions are generated in high temperature, which introduces threats to the user's health.

BRIEF SUMMARY OF THE INVENTION

The present invention provides an efficient heating groove for optical fiber fusion splicer to solve the problems existing in the prior art, through printing a heating resistor with certain parameters on a metal sheet with excellent heat conduction property and distribution of resistances, and meanwhile setting the heating groove shape as V-shaped. The present invention reduces production costs.

An optical fiber fusion splicer with the efficient heating groove is also provided in the present invention, to solve the problems which exist in the prior art.

The solution of the present invention is as follows:

An efficient heating groove for optical fiber fusion splicer is provided. The heat substrate of the heating groove is a metal sheet with excellent heat conducting property. The manufacturing method of the aforesaid heating groove comprises printing an insulating medium, heating resistor, transition point conductor, and protection glass glaze in sequence on the outer surface of the heating substrate metal sheet having excellent heat conducting property, by means of thick film screen printing, wherein two heating resistors, each with a resistance of $4.7\pm0.5\Omega$ and power density of 10-20 $W/cm^2$, are separately printed on the outer face of the two heating surfaces in aforesaid heating groove. Said heating resistor is made of resistive material which has a temperature coefficient of $1500\pm150$ ppm/°C. The resistance of the heating resistor distributes in such a way that the resistance at two ends is larger than the resistance at the center, and the resistance is reduced gradually or by step, from two ends to the center. In the present invention, the heating resistor with preferred resistance, power density, and temperature coefficient is printed on a metal sheet with excellent heat conducting property. Hence, temperature rising and heat shrinking effect is enhanced significantly, and the heat shrinking time is reduced dramatically.

In order to ensure that the resistance distributes in such a way that the resistance at two ends is larger than the resistance at the center, and that the resistance is reduced gradually or by step from two ends to the center, it can be completed in the following way, for example. The heating resistor is printed thickly at the center and printed thinly at two ends, or a resistance material with lower power density is used at the center and a resistance material with higher power density is used at two ends. Thus, the resistance at two ends is smaller and the resistance at the center is larger. By setting resistance of the heating resistor in this way, the temperature difference between two ends of the resistor and the center of the resistor can be reduced significantly and the effect of heating is enhanced, therefore reducing the time needed for heating.

Here, the metal sheet with excellent heat conducting property, is preferably stainless steel, and more preferably is stainless steel SUS430, which can heat the heating groove to 200° C. in 6 seconds because of its excellent heat conducting property. By printing glass glaze on the side of the stainless steel substrate, the heating groove has a good performance of heat-resisting (more than 400° C.). Meanwhile, the shape of the stainless steel could be molded simply, easily, and cheaply, through bending. Furthermore, SUS430 stainless steel has high strength, which enables many kinds of materials, including insulating medium, heating resistor, transition point conductor, and protection glass glaze, to be printed on it. Meanwhile, for aluminum material commonly used at present, because of its low density, it becomes soft and therefore needs to be supported by a frame when it is manufactured to thin sheets as a heating substrate. It is also impossible to print materials like insulating medium, heating resistor, transition point conductor, and protection glass glaze on aluminum materials by means of thick film screen printing. The production process will be more difficult. Moreover, stainless steel never generates aluminum ions, which is more environmentally friendly for users.

In one preferred embodiment of present invention, the shape of the heating groove is optimized. Specifically, the heating groove comprises two heat surfaces connected to each other, wherein the two heat surfaces, or the extending planes of said two heat surfaces, form an angle. In the pre-heating or heat shrinking process of the shrinkable protection sleeve, said two heat surfaces both linearly contact with the outer surface of the shrinkable protection sleeve. By setting the heating groove in the above-noted shape, the circular shrinkable protection sleeve can be pre-heated at two edges simultaneously. The shrinkable protection sleeve maintains contact with the heating groove at two edges, even after heat shrinking and the declining process of the shrinkable protection sleeve. Therefore, the heat conducting efficiency of the heat shrinking process is enhanced significantly.

In comparison with the prior art, the present invention has advantages as follows:

Firstly, the material parameters and distribution methods of the heating resistor in the heating groove is optimized in the present invention. Consequently, the effect of heating and heat shrinking is enhanced significantly, and the heat shrinking time is reduced dramatically.

Secondly, the heating groove, which is made of stainless steel, could be heated to 200° C. in 6 seconds with the aid of excellent heat conducting property of stainless steel, especially SUS430. Also, the heating groove is easy to mold and manufacture. Stainless steel never generates aluminum ions, which is more environmentally friendly for users. By printing glass glaze on the side of the stainless steel substrate, the heating groove has a good performance of heat-resistance (more than 400° C.).

Thirdly, the heating groove of the present invention comprises two heat surfaces which maintain contact with the shrinkable protection sleeve, even in heat shrinking and the declining process of the shrinkable protection sleeve. As a result, the heat conducting efficiency is enhanced significantly.

A product implementing this invention will not always obtain all the aforesaid advantages simultaneously.

BRIEF DESCRIPTION OF THE DRAWINGS

FIGS. 3A (1), 3A (2) and 3A (3) are resistance distribution curve diagrams of several resistors in heating groove of the present invention.

DETAILED DESCRIPTION OF THE PREFERRED EMBODIMENTS

An efficient heating groove for an optical fiber fusion splicer is provided in the present invention. The heating substrate of aforesaid heating groove is a metal sheet with excellent heat conducting property. The manufacture process of aforesaid heating groove comprises printing, insulating medium, heating resistor, transition point conductor, and protection glass glaze in sequence, on the outer surface of the heating substrate metal sheet with excellent heat conducting property, by means of thick film screen printing. Two heating resistors are separately printed on the outer face of the two heating surfaces in aforesaid heating groove, each resistor with a resistance of $4.7\pm0.5\Omega$ and power density of 10-20 $W/cm^2$. The heating resistors are made of resistive material with a temperature coefficient of $1500\pm150$ ppm/° C. Since the heating resistor, with preferred resistance, power density, and temperature coefficient, is printed on a metal sheet with excellent heat conducting property, the effect of heating and heat shrinking is enhanced significantly, and the heat shrinking time is reduced significantly. In a further preferred embodiment, the heating resistor has a resistance of $4.7\pm0.2\Omega$, and a power density of 10-15 $W/cm^2$.

Figure 1:
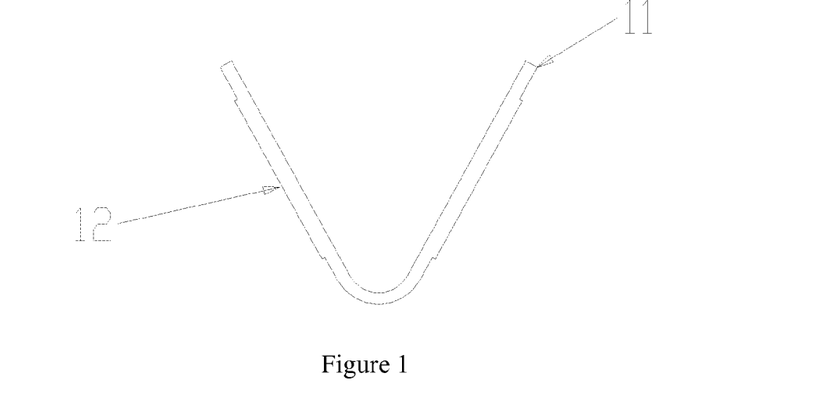
FIG. 1 is a structure diagram of the heating substrate and heating resistor in the heating groove of the present invention.

The position relationship between the heating resistor and the heating substrate is shown in FIG. 1, in which, reference sign 11 indicates the heating substrate, and reference sign 12 indicates the heating resistor and the protection glass glaze attached thereof.

As verified in repeated experiments performed by the inventor, if heating resistors, with aforesaid parameters scope, are printed on a metal sheet with excellent heat conducting property, the heat shrinking time will be reduced significantly; however, if the parameters of the heating resistor is not in the range of the aforesaid scope, the heat shrinking time will not meet the criteria.

Figure 2:
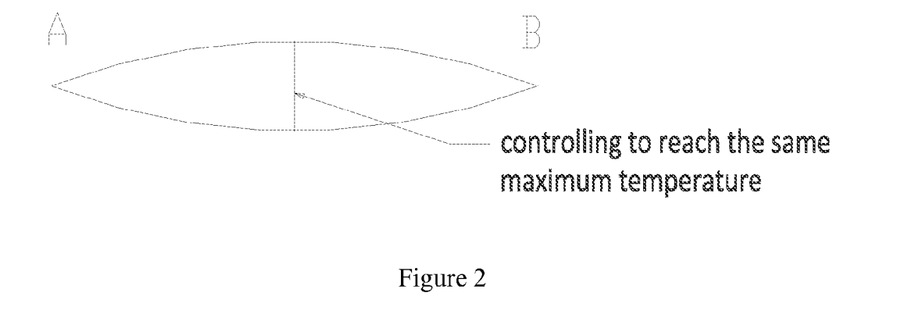
FIG. 2 is a thermal image of the contact surface in the heating groove, generated after the heating resistor is warmed up, in which resistance is uniformly distributed.
Figure 3A:
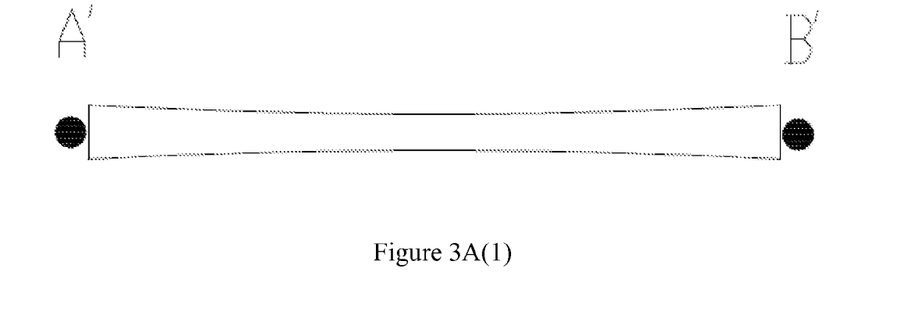
Figure 3B:
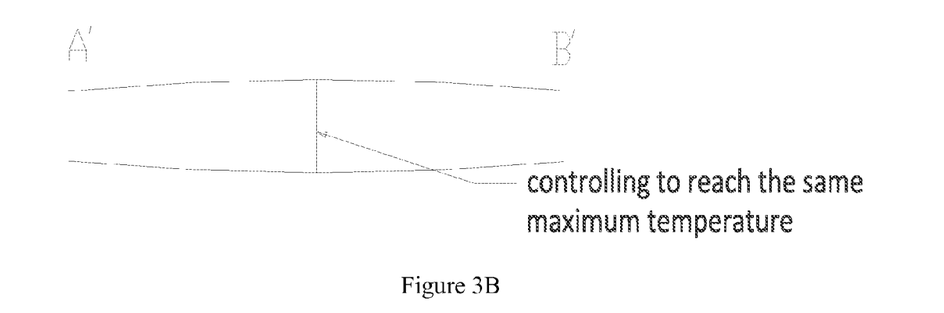
FIG. 3B is a thermal image of the contact surface, generated after the heating resistor is warmed up, which has a resistance distribution of FIG. 3A (1).

In the present invention, several experiments, using heating resistors with resistance uniformly distributed at the center and the two ends applied in aforesaid heating groove, show that, if the temperature of the heating resistors is no more than the threshold level (usually 250° C.), the temperature of two ends in left and right sides of the heating groove will rise slowly, as shown in FIG. 2, which show a thermal image figure of the whole contact surface in the heating groove after heating, wherein the reference signs A and B indicate two ends of the heating groove. In the FIG. 2, it is shown that temperature in the center of the heating groove differs dramatically from temperature of the two ends, which results in the poor performance of the thermal shrinking ,and the two ends shrinking more slowly, which causes longer heat shrinking time. In order to solve aforesaid problem, the resistance distribution of the heating resistor is improved by means of adjusting the printing thickness at two ends of the heating resistor, or using different material with different power density respectively, at two ends and at the center. For example, the heating resistor is printed thickly at the center, and printed thinly at two ends, or resistance material with lower power density is used at the center, resistance material with higher power density is used at two ends, hence the resistance at two ends of the heating resistor is larger than that at center, furthermore, by adjusting the thickness and power density of the resistance materials at the center and two ends, the resistance of the heating resistor is reduced gradually or by step, from two ends to the center. As can be seen in FIG. 3A (1), 3A (2), and 3A (3), resistance curves of several preferred heating resistors are illustrated, wherein the reference signs A' and B' indicate two ends of the heating resistor. (Two black dots in the figure indicate the transition conductor connecting the resistor to a wire connected to a main board). Specifically, the resistance of the heating resistor is reduced gradually from two ends to the center, as in FIG. 3A (1); or reduced by step from two ends to the center, as in FIG. 3A (2) and 3A (3). The number of steps is not limited, could be 2 steps as in FIG. 3A (2), or more steps, for example 4 steps as in FIG. 3A (3). In addition, all other methods of reducing by steps are included in present invention. In the present invention, the resistance difference, between the two ends of the resistor and the center of the resistor, could be changed manually, the thermal image figure in the contact area of the heating groove could be homogenized to a large extent, and temperature difference between the center and the left or right ends could be reduced, (the temperature difference still exists, to make sure the air in the sleeve could be exhausted out when it is heat shrinking). As can be seen in FIG. 3B, which is a thermal image figure of the contact surface of the heating sleeve, with heating resistor having a resistance distribution as FIG. 3A (1), is warmed up. wherein A' and B' indicate two ends of the heating groove. This shows that the temperature rising effect is enhanced, and time of temperature rising is reduced, if a heating resistor with a resistance distribution as showed in FIG. 3A (1), was applied.

Here, the metal sheet with excellent heat conducting property, is preferably stainless steel, more preferably, stainless steel SUS430, which has superexcellent heat conducting property, enables the heating groove to be heated to 200° C. in 6 seconds. Protection glass glaze printed on the side of the stainless steel substrate, enables the heating groove with high heat-resistance (more than 400° C.). Furthermore, shape of the stainless steel could be molded, simply, easily, and cheaply, through bending. Comparing to aluminum material, stainless steel has many advantages, such as high strength, so it can support many kinds of the materials coating thereon, like insulating medium, heating resistor, transition point conductor, and protection glass glaze. However, aluminum material, commonly used at present, is low in intensity, when manufactured to thin sheet as heating substrate, it will be soft, hence, the coating layers on it will peel off. It is impossible to print materials, like insulating medium, heating resistor, transition point conductor, and protection glass glaze, on aluminum materials by means of thick film screen printing. The production process will be more difficult. If special aluminum materials were applied, cost will be increased significantly. Moreover, stainless steel never generates aluminum ions, which is more environmentally friendly for users. Stainless steel is cheaper than PI heating film, and could be heated in large area. In one preferred embodiment, the thickness of the stainless steel is 0.2 to 0.5 mm.

In the present invention, the shape of the heating groove has been optimized. Specifically, the heating groove comprises two heat surfaces connected to each other. The two heat surfaces or the extend plane along said two heat surfaces, form an angle. In the pre-heating and heat shrinking process of the shrinkable protection sleeve, said two heat surfaces both linearly contact with the outer surface of the shrinkable protection sleeve. In the present invention, the key point is the two heat surfaces that always linearly contact with the outer surface of the shrinkable protection sleeve, and referring to the shape of the connecting position between two heat surfaces, it could select any manner of implementation. Take production convenience and equipment into consideration, such as sharp-angled, circular arc, planar, which could be easily produced, are selected to manufacture the connecting position between the two heat surfaces. Other suitable and implemental shapes, besides aforesaid example, could be applied in present invention.

Preferably, the heating groove is V-shaped, and the connecting position between two heat surfaces forms a circular arc.

The angle between the two heat surfaces or the extend planes along the two heat surfaces, is not limited. Preferably, the angle between two heat surfaces of the heating groove is 58° to 62°.

Figure 4:
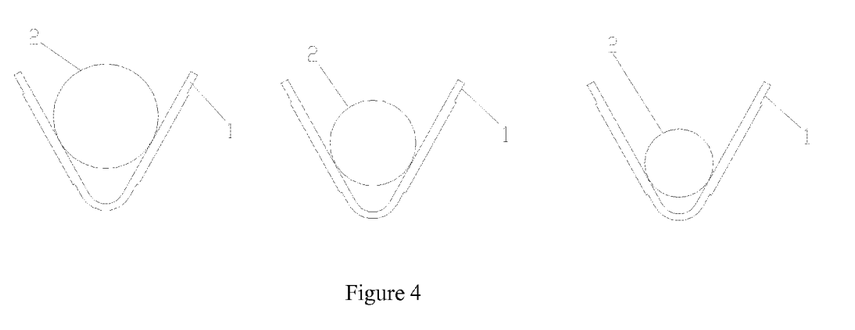
FIG. 4 is a heat shrinking process diagram of the heating groove in one preferred embodiment of the present invention.

Now referring to FIG. 4, it shows a heat shrinking process diagram of a heating groove in aforesaid preferred embodiment of the present invention. Wherein, reference sign 1 indicates the heating groove, and reference sign 2 indicates the shrinkable protection sleeve.

Furthermore, in order to prevent the shrinkable protection sleeve from being pasted on the heating groove, inner surface of the heating groove is processed with black heat-resistant anti-adhesion coating, preferably.

Figure 5:
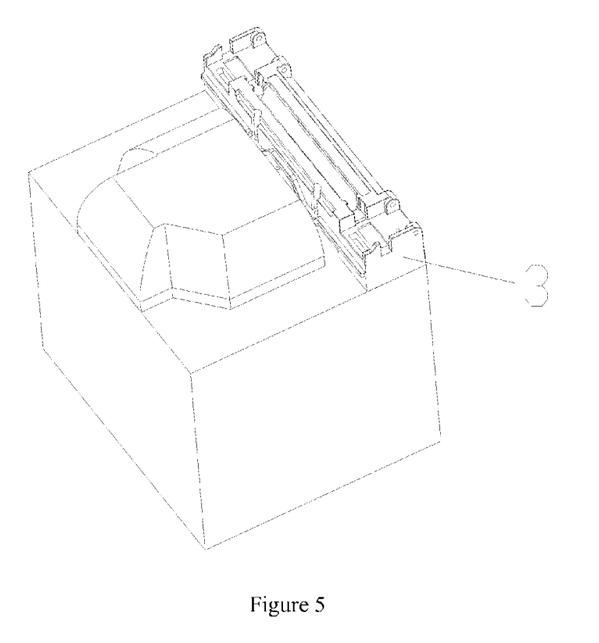
FIG. 5 shows a fusion splicer with a heating groove of the present invention.
Figure 6A:
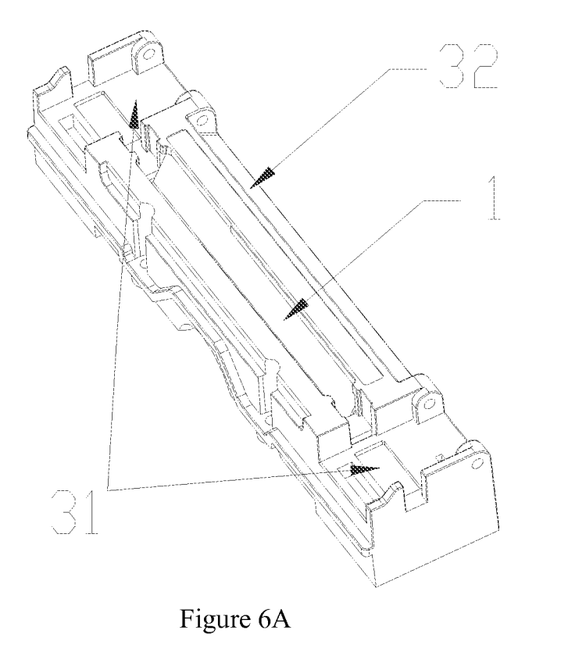
FIG. 6A is a three-dimensional structure diagram of the heat shrinking device in the fusion splicer with a heating groove of the present invention.
Figure 6B:
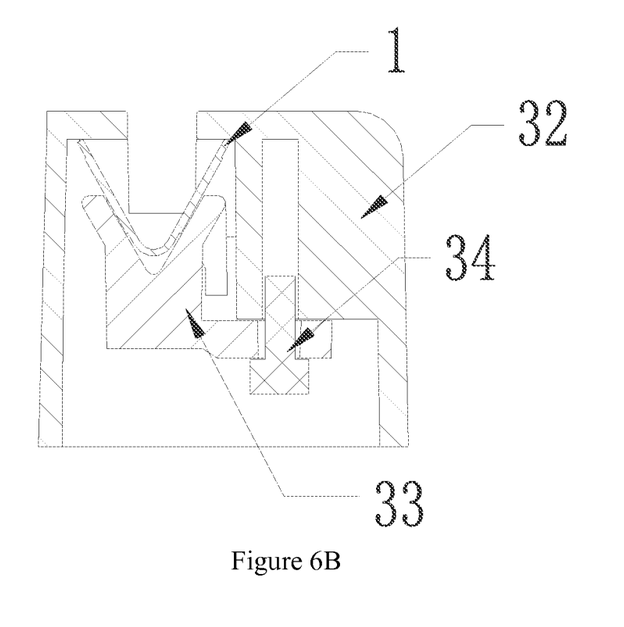
FIG. 6B is a cross-sectional drawing of the heat shrinking device in the fusion splicer with a heating groove of the present invention.

A fusion splicer of the present invention is shown in FIG. 5, the fusion splicer comprises a heat shrinking device 3, and the heat shrinking device 3 is commonly mounted on a side that is away from the operator of the surface of the fusion splicer. As can be seen in FIGS. 6A and 6B, the heat shrinking device 3 usually comprises, a clamps 31 that is arranged at two ends, a heat base casing 32, and a heating groove 1 arranged transversely in the center position. Specifically, the heating groove 1 is V-shaped preferably, and is mounted via a V-shaped high heat-resistance frame 33, which is mounted on the heat base casing 32 via screws 34.

In the following, the present invention is described detailed, reference to embodiments.

Embodiment 1

Figure 7:
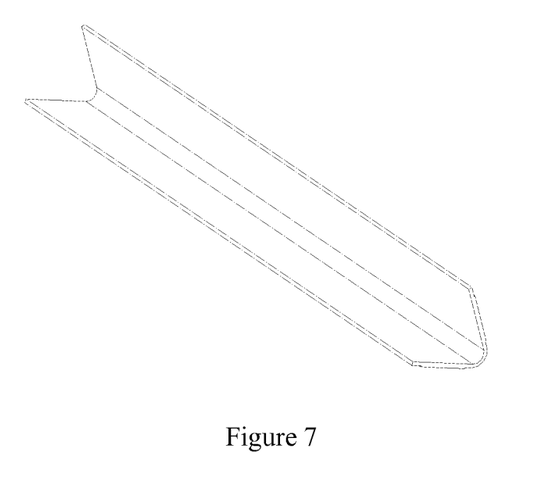
FIG. 7 is a three-dimensional structure diagram of the heating groove in a first embodiment of the present invention.

FIG. 7 shows the heating groove in this embodiment, wherein a V-shaped sheet of SUS430 steel with a thickness of 0.4 mm is applied as the heat substrate. The angle between the two heat surfaces is 58±1°. And the heating resistor, which is printed on the outer surface of the heat surface, has a resistance of 4.7±0.2Ω, and has a resistance curve of wide at two ends, and narrow at center, as shown in FIG. 3A (1). Adjustment of the resistance is performed by means of regulating the thickness of two ends, the center, and transition part, during printing the heating resistor. The heating resistor is made of resistive material, with a temperature coefficient of 1500±150 ppm/° C. Meanwhile, the inner surface of the heating groove, which is also the inner surface of the stainless steel, is processed with black heat-resistant anti-adhesion coating.

Figure 8:
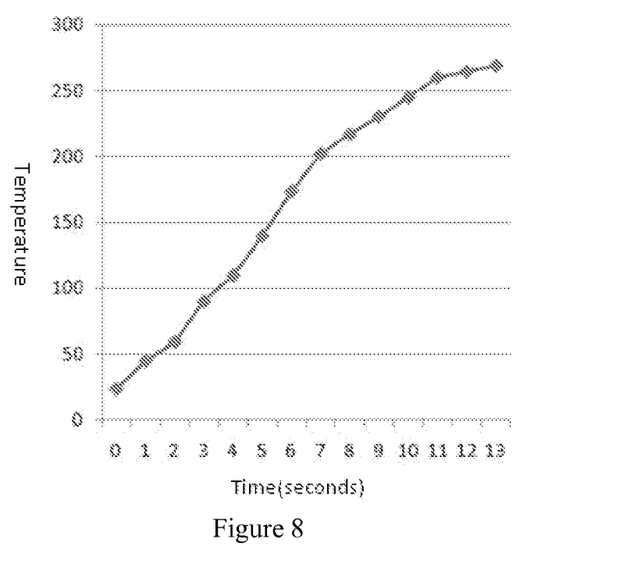
FIG. 8 is a heating curve of the heating groove in a first embodiment of the present invention.

The heating groove in this embodiment is used in temperature rising experiment, and the following result is obtained: the heat shrinking time of standard shrinkable protection sleeve, with 60 mm length and about 1.3 mm inner diameter, is reduced to about 14s to 16s. The temperature rising curve of the heating groove is shown in FIG. 8, and the slope of it indicates that the heating groove could reach ideal temperature rapidly. Compared to 35 seconds, which is needed in heat shrinking process in the prior art, the efficiency of optical fiber fusion is improved significantly using the heating groove in present invention.

The preferred embodiment, disclosed above, is described to illustrate the present invention. The preferred embodiment is merely a specific embodiment, is not described all details, and do not limit the scope of the present invention to the aforementioned embodiments. Obviously, many modifications and variation could be made, according to present invention. The aim of selecting and describing these embodiments in detail is just to explain the principle and application of the present invention, hence, the skilled person in the art could understand and use the present invention well. The present invention is limited in the scope of claims attached and equivalent.

The invention claimed is:

1. A heating groove for an optical fiber fusion splicer, comprising:
   a heating substrate of said heating groove which is a metal sheet with a heat conducting property,
   wherein an outer surface of the heating substrate includes sequentially printed elements from thick film screen printing, said sequentially printed elements including an insulating medium, at least one heating resistor, a transition point conductor, and a protection glass glaze on the outer surface of the heating substrate;
   wherein said at least one heating resistor includes two heating resistors, each heating resistor with a resistance of $4.7\pm0.5\Omega$ and power density of 10-20 W/cm$^2$, which are separately printed on an outer face of two heating surfaces in the heating groove;
   wherein said at least one heating resistor is made of a resistive material with a temperature coefficient of 1500 ppm±150 ppm/° C.; and
   wherein the resistance of said at least one heating resistor is distributed such that resistance at two ends thereof is larger than that at a center, and the resistance is reduced, gradually or by step, from two ends to the center.

2. The heating groove for an optical fiber fusion splicer according to claim 1, 15 wherein each heating resistor has a resistance of $4.7\pm0.2\Omega$ and power density of 10-15 W/cm$^2$.

3. The heating groove for an optical fiber fusion splicer according to claim 1, wherein said metal sheet with the heat conducting property is a stainless steel sheet.

4. The heating groove for an optical fiber fusion splicer according to claim 3, wherein said stainless steel sheet is made of SUS430 stainless steel, with a thickness of 0.2 to 0.5 mm.

5. The heating groove for an optical fiber fusion splicer according to claim 1, wherein the heating groove comprises two heating surfaces; said two heating surfaces or extending planes along said two heating surfaces form an angle; said two heating surfaces are connected to each other; and in a pre-heating or heat shrinking process of a shrinkable protection sleeve, said two heating surfaces both linearly contact with an outer surface of the shrinkable protection sleeve.

6. The heating groove for an optical fiber fusion splicer according to claim 5, wherein a connecting position between said two heating surfaces is one of a sharp-angle, a circular arc, or planar.

7. The heating groove for an optical fiber fusion splicer according to claim 6, wherein the heating groove is V-shaped.

8. The heating groove for an optical fiber fusion splicer according to claim 5, wherein the sharp angle between two heating surfaces of the heating groove is from 58° to 62°.

9. The heating groove for an optical fiber fusion splicer according to claim 1, wherein an inner surface of the heating groove is processed with a black heat-resistant anti-adhesion coating.

10. An optical fiber fusion splicer, which comprises a heat shrinking device with a heating groove, wherein said heating groove is the heating groove for an optical fiber fusion splicer according to claim 1.

* * * * *